May 31, 1949.  H. W. FLEMING  2,471,520
PRODUCTION OF ETHYLENE DIFORMATE
Filed June 10, 1946
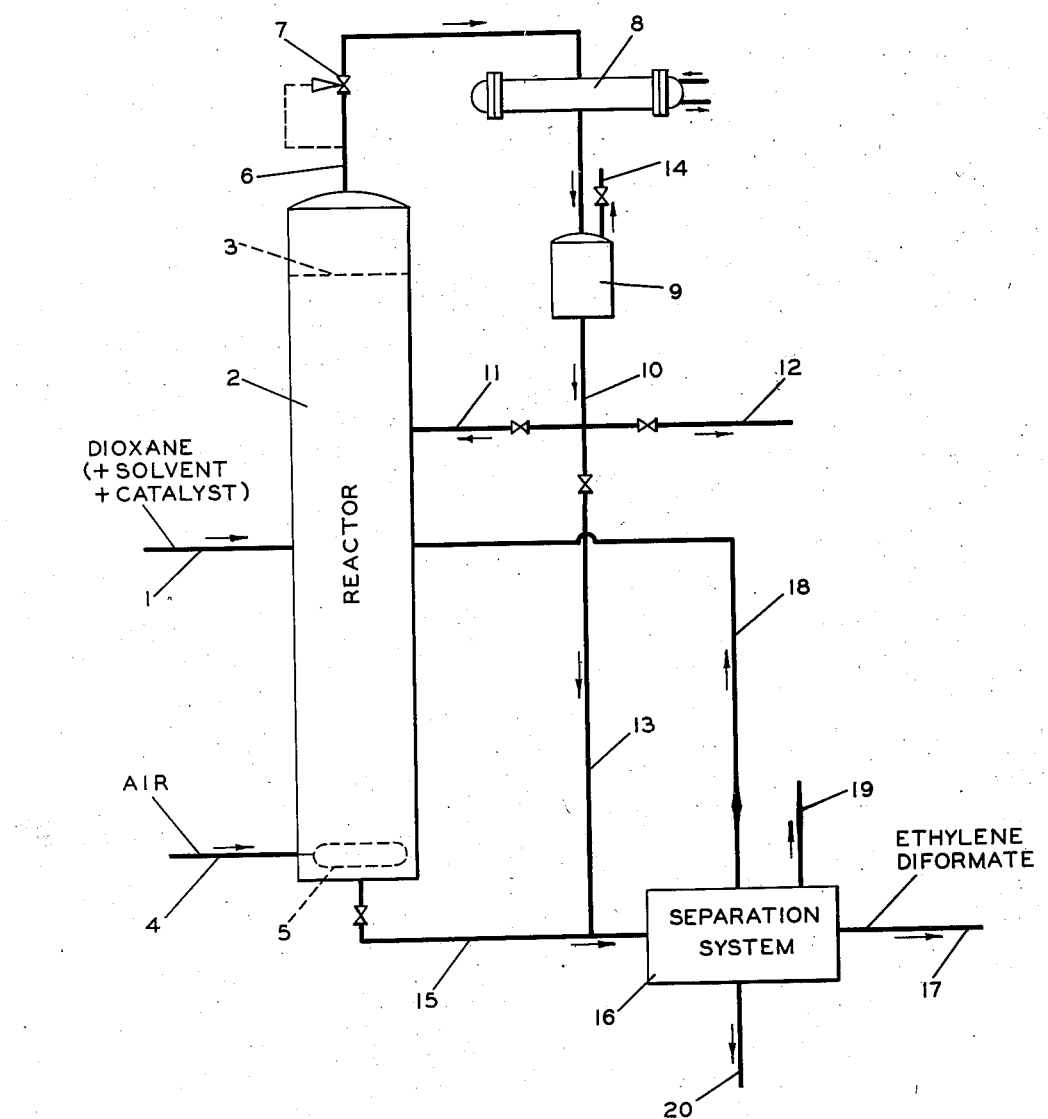
INVENTOR.
H. W. FLEMING
BY Hudson and Young
ATTORNEYS Patented May 31, 1949

2,471,520

UNITED STATES PATENT OFFICE 2,471,520

PRODUCTION OF ETHYLENE DIFORMATE

Harold W. Fleming, Bartlesville, Okla., assignor to Phillips Petroleum Company, a corporation of Delaware Application June 10, 1946, Serial No. 675,811

12 Claims. (Cl. 260—478)

This invention relates to the production of ethylene diformate by the oxidation of dioxane. In one of its aspects it relates to the oxidation of dioxane to ethylene diformate with an oxygen-containing gas. In another aspect it relates to the catalyzed oxidation of dioxane to ethylene diformate with an oxygen-containing gas and with an oxidation catalyst.

As used herein, the term "dioxane" has its conventional meaning, denoting 1,4-dioxane, also known as diethylene oxide and having the structural formula

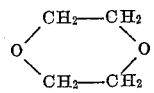

As used herein, the term "oxygen-containing gas" means any gas containing a substantial proportion of free oxygen, and includes air, oxygen-enriched air, oxygen-depleted air, pure oxygen, etc.

The principal object of the present invention is to provide an improved method of manufacturing ethylene diformate. Another object is to provide a method of converting dioxane to ethylene diformate. Another object is to provide a method of obtaining ethylene diformate in good yield from dioxane. Another object is to provide a simple and economical method of manufacturing ethylene diformate from dioxane. Another object is to provide a method as in the foregoing objects which requires a minimum investment for apparatus. Numerous other objects will more fully hereinafter appear.

The accompanying drawing portrays diagrammatically one arrangement of equipment which may be used for practicing the present invention.

My invention is based on the unexpected discovery that dioxane can be oxidized to ethylene diformate ($CH_2COOH)_2$, also known as glycol diformate, with an oxygen-containing gas.

During the course of experimental work in which I was attempting to oxidize cyclopentane to valuable organic compounds, I employed dioxane as a solvent for the cyclopentane. Unexpectedly, I found that the dioxane was oxidized to ethylene diformate in good yield. The cyclopentane was substantially unaffected and so functioned as a solvent for the dioxane.

The reaction may be indicated by the following equation:

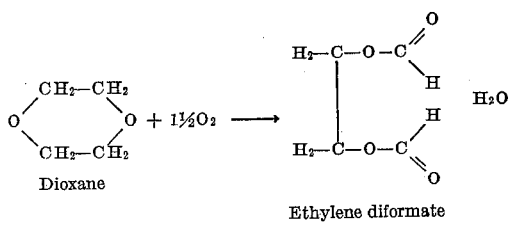

A typical method of carrying out my invention is as follows. A body of dioxane is placed in a closed pressure-resisting reaction vessel of any suitable type. A suitable oxidation catalyst is introduced into the dioxane. Air or other suitable oxygen-containing gas is then bubbled through the liquid dioxane. The temperature and other conditions are adjusted to effect a good conversion of the dioxane to ethylene diformate. Oxygen-containing gas is withdrawn from the free space in the reactor at a rate such as to hold the pressure substantially constant in the reaction zone. This may be accomplished in known manner, for example, by use of a suitable pressure control valve or back pressure regulator on the air outlet line. The gas so withdrawn usually contains appreciable amounts of volatilized organic compounds picked up in the reactor, and to prevent loss of such compounds I prefer to pass the withdrawn gas through a suitable condenser wherein the vaporized organic compounds are condensed for recycle to the reactor or for passage to the recovery system in which the product and recycle streams are separated. The residue gas may be discarded or it may by recycled. Where the oxidizing gas used contains nitrogen or other inert diluent, it may be desirable to vent the off-gas from the condenser to the atmosphere to prevent pyramiding of such inert gas in the system. If the oxidizing gas is desirably rich in oxygen, the off-gas from the condenser may be recycled to the reactor.

In some cases, as where essentially pure oxygen is used as the oxidizing gas, it may be desirable to return the withdrawn gaseous mixture to the reaction zone. This eliminates the need for a condenser. The withdrawn gas, composed of unreacted oxygen and volatilized organic compounds, may be recompressed and re-injected into the liquid reaction mixture. In this way any volatilized dioxane, solvent, ethylene diformate or other organic material is conserved by return to the reaction zone.

Since the reaction mixture is ordinarily at high pressure, it is necessary to introduce the air or other oxygen-containing gas under slightly higher pressure. I prefer to introduce the oxidizing gas below the surface of the liquid and bubble it upwardly therethrough. I prefer to introduce the gas in such manner that it is divided into very fine bubbles which can very intimately contact the liquid. Any suitable dispersion means may be employed, such as a fritted glass disc attached to the air inlet. The dispersion means may be perforated on one or both sides, the latter being preferred. The diffusion plate may be made of any suitable material other than fritted glass, if desired. Ordinarily it is located closely adjacent the bottom of the reaction vessel. More than one diffusion plate may be used.

Any desired equipment may be employed for promoting the desired very intimate contact between the oxidizing gas and the reaction liquid. The reaction zone may be filled with packing, or it may be provided with bubble trays to promote the necessary contact. Agitation may be employed. If desired, rotating turbines which trap the gas and divide it into very small bubbles may be used. In some cases, the oxidizing gas may be introduced through ports moved at high velocity through the reaction liquid. Such ports may be carried by mixing blades or impellers, for example, in a manner similar to that shown in Matuszak U. S. Patent 2,392,542. The oxidizing gas may be introduced through jets or orifices.

It is to be understood that the foregoing does not limit my invention. For example, while the invention is ordinarily carried out by providing a relatively large body of reaction liquid including the dioxanes, and passing the oxidizing gas through this body in the form of bubbles, usually finely divided, other modes of practicing the invention may be used. In its broad aspect the invention resides in oxidizing dioxane to ethylene diformate with an oxygen-containing gas in any manner. In its preferred aspect it resides in oxidizing dioxane in the liquid phase with an oxygen-containing gas in any manner.

The invention may be carried out either batchwise or continuously. In batch-type operation, a charge of liquid dioxane, with or without a solvent, together with a catalyst, may be placed in a closed pressure-resisting vessel and air or other oxidizing gas passed therethrough for the desired reaction time, preferably with withdrawal of air containing volatilized liquids from the gas space above the liquid in the reaction zone at a rate sufficient to hold the pressure substantially constant, and cooling of said withdrawn air to condense said voaltilized liquids. The resulting liquid condensate either may be returned to the reaction zone or at the end of the reaction period may be merged with the reaction mixture. The resulting mixture may then be fractionally distilled to recover the ethylene diformate contained therein as the product of the process.

In continuous operation the oxygen-containing gas may be introduced continuously through the liquid reaction mixture. Usually the contact time is considerably shorter in a continuous operation than in a batch operation. The oxygen-containing gas containing volatilized liquids is preferably continuously withdrawn from the gas space above the reaction liquid at a rate such as to hold the pressure substantially constant. This withdrawn gas is cooled as before to condense the volatilized organic liquids. Preferably the resulting liquid condensate is continuously returned to the reaction zone. The liquid reaction mixture is continuously withdrawn from the reaction zone and passed to a suitable fractional distillation system for recovery of the ethylene diformate. Preferably there is also recovered a fraction of unreacted dioxane which is continuously recycled to the reaction zone. There is also continuously introduced to the reaction zone fresh dioxane in amount sufficient to maintain the quantity thereof in the reaction zone substantially constant. If a solvent is used for the dioxane, suitable provision is made for charging of fresh solvent and recycle of recovered solvent. If desired, provision may be made for introducing catalyst as needed to the reaction zone. This makeup catalyst may be charged with the fresh dioxane. In some cases it may be desirable to withdraw catalyst continuously for the reaction zone. For example, the withdrawn reaction mixture may contain a representative concentration of catalyst. This catalyst may be recovered in the separation system and may be treated to regenerate it and then returned to the reactor.

The pressure in the reaction zone may vary over wide limits. However, I prefer to use a pressure of from 350 to 500 pounds per square inch gage. Such pressure is adequate to maintain the dioxane, any solvent, and reaction products substantially entirely in the liquid phase.

I have found that a reaction temperature of from 100 to 150° C. is extremely satisfactory for carrying out the reaction of the present invention. This temperature range is preferred; however, within the broader aspects of my invention the oxidation of dioxane to ethylene diformate with an oxygen-containing gas may be carried out at any suitable temperature above or below this range.

The contact time may vary widely. The contact time in a batch operation will generally be considerably greater than that for a continuous operation. For example, for batch type operation, I prefer to use contact times of from 5 to 10 hours; whereas for continuous operation, contact times of from 10 to 60 minutes are preferred.

The rate at which the air or other oxidizing gas is introduced to the reaction mixture may vary over wide limits; however, I prefer to employ a rate of from 20 to 130 gas volumes (measured at standard conditions of temperature and pressure) of air or other oxygen-containing gas per volume of liquid dioxane in the reaction zone per hour. In specifying this rate, I refer to the actual volume of liquid dioxane, considered without reference to any liquid solvent which may be present.

I prefer to use a catalyst for the oxidation reaction. In some cases the catalyst may be omitted since I have found that the oxidation of dioxane takes place more easily than the oxidation of hydrocarbons. I believe that the reaction takes place principally if not exclusively in the liquid phase wherein dioxane is brought into contact with both oxygen and catalyst. However, it is possible that a small amount of reaction takes place in the gas phase above the liquid reaction mixture. No catalyst is present in the gas phase, therefore the present invention in its broadest aspect resides in oxidizing dioxane to ethylene diformate with an oxygen-containing gas in the presence or absence of a catalyst.

As the catalyst, I may use any organic acid salt of a divalent heavy metal which is stable under the conditions of the reaction. A preferred catalyst is cobaltous acetate. Instead of cobalt I may use any other divalent heavy metal. Examples are iron, cadmium, lead, nickel, copper, zinc, manganese, chromium, mercury, etc. As the organic acid I may use any carboxylic acid. Examples are the mono-basic acids, such as any monobasic acid ranging from acetic to acids having 20 or more carbon atoms per molecule, di-basic acids such as any acid in the series of from oxalic to sebacic, benzoic acid, phthalic acid, naphthenic acid, rosin or abietic acid, any of the acids derived from the drying, semi-drying or non-drying glyceride oils, etc. The acids may be either saturated or unsaturated. They may carry a hydroxy group, examples being citric acid, ricinoleic acid, lactic acid, etc.

The amount of catalyst employed is generally quite small. Only a trace of catalyst is required to show an appreciable effect. Ordinarily I employ less than 1 per cent by weight of catalyst based on the weight of dioxane present in the reaction zone. Often the catalyst will range from 0.05 to 0.5 per cent by weight based on the dioxane present. The catalyst is usually at least slightly soluble in the reaction mixture. Evidently it is the dissolved catalyst which catalyzes the reaction.

The use of a catalyst in carrying out the present invention is highly advantageous because it enables one to lower the threshold conversion per pass, thereby giving a higher overall efficiency.

A solvent may or may not be used in carrying out the present invention. Ordinarily the use of a solvent is preferred. Any suitable organic liquid which is inert or substantially inert and is liquid under the conditions of the reaction may be used. An example of a suitable solvent is cyclopentane. Instead of cyclopentane, I may use other cycloparaffins such as methyl cyclopentane, cyclohexane, or methyl cyclohexane, or I may use acyclic paraffins which are liquid under the reaction conditions, examples being butanes, pentanes, hexanes, etc.

The oxygen-containing gas is generally air. Instead of air I may use other oxygen-containing gases having about the same oxygen content as air, or I may use gases richer or poorer in oxygen than air. In some cases the use of pure oxygen may be justified. Where gaseous mixtures containing oxygen are used, the gas in admixture with the oxygen may be any inert gas such as nitrogen, carbon monoxide, carbon dioxide, methane, ethane, helium, etc.

While it is more advantageous to carry out the reaction with the reactants (other than the oxygen-containing gas) in the liquid phase, it is not outside the scope of my invention in its broadest aspects to carry out the oxidation with the dioxane in the gas phase. As pointed out above, in liquid phase operation, oxidation may take place to a small extent in the gas phase above the liquid as well as in the gas phase.

Vacuum distillation is preferably employed in the recovery of the ethylene diformate product fraction. Use of a vacuum during the distillation of the ethylene diformate reduces decomposition reactions which are undesirable.

The reactants in the process of this invention consist of dioxane and oxygen. The only other materials ordinarily present are the catalyst and the solvent, if used, and, of course, the intermediate and final reaction products. Water is usually substantially absent except for the water formed in the reaction.

In the accompanying drawing there is portrayed equipment which may be used alternatively for batchwise or continuous operation. In the drawing, dioxane, optionally with a solvent and a suitable amount of catalyst, is charged to the system via line 1 which enters reactor 2 which is shown as a vertical, elongated vessel. Liquid dioxane fills reactor 2 to a level indicated by reference numeral 3. Air or other oxidizing gas is introduced via line 4 which connects to a perforated diffusion plate 5 located near the bottom of the reactor. The gas is withdrawn from the gas space above the liquid via line 6 which is provided with pressure control valve or back pressure regulator 7 which holds the pressure in vessel 2 substantially constant. This gas is passed through condenser 8 where it is cooled sufficiently to condense the volatilized organic liquids contained therein. The liquid condensate is collected in accumulator 9 whence it may be withdrawn via line 10 for return to reactor 2 via line 11, for withdrawal from the system via line 12 or for merger with the reaction mixture withdrawn from reactor 2 via line 13. The residual gas may be vented from the system via line 14. The reaction mixture is withdrawn via line 15 from reactor 2 either batchwise or continuously as desired and is passed to separation system 16 which is shown only schematically. A fraction of ethylene diformate is withdrawn via line 17 as the product of the process. A fraction of unreacted dioxane may be separated and recycled to reactor 2 via line 18. If a solvent is used, it may be separated from the reaction effluent either in admixture with the unreacted dioxane or as a separate fraction for recycle. Usually some formic acid is formed as by-product, and this may be separated via line 19. Generally, also some material higher boiling than ethylene diformate is formed, and this may be withdrawn via line 20. The water formed by the reaction may be separated in any suitable manner. Since water and formic acid form an azeotrope of the maximum-boiling type, it may be desirable to remove the formic acid and the water together.

Following is a specific example of the practice of my invention.

*Example*

To a cylindrical, glass-lined, electrically heated, steel reactor 2 inches in diameter and 48 inches in height, were charged 500 ml. of dioxane, 500 ml. of cyclopentane, and 1 gram of cobaltous acetate tetrahydrate. Air was passed into the reactor through an inlet tube connected to a fritted glass disc internally situated near the bottom of the reactor. Effluent air was withdrawn through an outlet at the rate of about 60 liters (STP) per hour and was passed through a water-cooled condenser and through a dry-ice trap. After a reaction time of 7 hours, during which the pressure was maintained at 400 pounds per square inch and the average temperature was 132° C., the contents of the reactor were cooled, withdrawn, combined with the contents of the dry-ice trap, and fractionated. Approximately 40 per cent of the dioxane charged was oxidized. Approximately 39.6 weight per cent of the total oxidation product was ethylene diformate, which was identified by determination of the boiling point, the refractive index, and the density. The identity was further substantiated by the determination of the melting point of the phenylhydrazine derivative. These determinations indicated that the ethylene diformate fraction contained only very small amounts of impurities.

By-products of the oxidation comprised formic acid and unidentified material higher boiling than ethylene diformate.

From the foregoing it will be seen that the present invention provides a simple, direct and economical method of synthesizing ethylene diformate from dioxane. The method gives good yields and requires a minimum of equipment. The method requires use of only a very small amount of catalyst, usually only a trace. Many other advantages of my invention will be apparent to those skilled in the art.

I claim:

1. The process which comprises oxidizing dioxane with an oxygen-containing gas at an elevated temperature and pressure such that ethylene diformate is formed.

2. The process which comprises oxidizing dioxane with an oxygen-containing gas in the presence of an oxidation catalyst composed of a stable divalent heavy metal salt of an organic carboxylic acid and at an elevated temperature and pressure such that ethylene diformate is formed.

3. The process of making ethylene diformate which comprises oxidizing dioxane with an oxygen-containing gas, the reaction being carried out at a temperature of from 100 to 150° C. and a pressure of from 350 to 550 pounds per square inch gauge.

4. The process of making ethylene diformate which comprises oxidizing dioxane with an oxygen-containing gas in the presence of an oxidation catalyst composed of a stable divalent heavy metal salt of an organic carboxylic acid and at a temperature of from 100 to 150° C. and a pressure of from 350 to 550 pounds per square inch gauge.

5. The process of making ethylene diformate which comprises oxidizing dioxane by bubbling air through liquid dioxane in the presence of an oxidation catalyst composed of a stable divalent heavy metal salt of an organic carboxylic acid and at a temperature of from 100 to 150° C. and a pressure of from 350 to 550 pounds per square inch gauge, said air being bubbled through at a rate of from 20 to 130 gas volumes (STP) of air per volume of liquid dioxane per hour.

6. The continuous process of making ethylene diformate which comprises oxidizing dioxane continuously by continuously bubbling an oxygen-containing gas through liquid dioxane for a contact time of from 10 to 60 minutes in the presence of an oxidation catalyst composed of a stable divalent heavy metal salt of an organic carboxylic acid and at a temperature of from 100 to 150° C. and a pressure of from 350 to 550 pounds per square inch gauge, continuously withdrawing from the gas space above the liquid oxygen-containing gas containing volatilized liquids, cooling said withdrawn gas to condense said volatilized liquids, continuously returning the resulting liquid condensate to the reaction zone, continuously withdrawing from the reaction zone liquid reaction mixture, fractionally distilling the withdrawn reaction mixture to recover a fraction of ethylene diformate as the product of the process and a fraction of unreacted dioxane, continuously recycling said unreacted dioxane fraction to the reaction zone, and continuously introducing to the reaction zone fresh dioxane in amount sufficient to maintain the quantity thereof in the reaction zone substantially constant.

7. The process of making ethylene diformate which comprises oxidizing dioxane by bubbling air through liquid dioxane in the presence of an oxidation catalyst composed of a stable divalent heavy metal salt of an organic carboxylic acid and at a temperature of from 100 to 150° C. and a pressure of from 350 to 550 pounds per square inch gauge, said air being bubbled through at a rate of from 20 to 130 gas volumes (STP) of air per volume of liquid dioxane per hour, conducting the process in a batchwise manner, continuing said bubbling for a period of time ranging from 5 to 10 hours, then withdrawing the resulting reaction mixture, and fractionally distilling same to recover ethylene diformate contained therein as the product of the process.

8. The process of making ethylene diformate which comprises oxidizing dioxane in the presence of an oxidation catalyst composed of cobaltous acetate at a temperature of from 100 to 150° C. and a pressure of from 350 to 500 pounds per square inch gauge by bubbling air through a liquid solution of dioxane in cyclopentane in the presence of said catalyst and under said conditions of temperature and pressure for a period of time ranging from 5 to 10 hours, introducing said air at a rate of 20 to 130 gas volumes (STP) of air per liquid volume of dioxane per hour, during said oxidation withdrawing air containing volatilized liquids from the gas space above the liquid in the reaction zone at a rate sufficient to hold the pressure substantially constant, cooling said withdrawn air to condense said volatilized liquids, returning the resulting liquid condensate to the reaction zone, and at the end of said period fractionally distilling the reaction mixture to recover therefrom ethylene diformate contained therein as the product of the process.

9. The process of making ethylene diformate which comprises oxidizing dioxane in the presence of an oxidation catalyst composed of cobaltous acetate at a temperature of from 100 to 150° C. and a pressure of from 350 to 500 pounds per square inch gauge by bubbling air through a liquid solution of dioxane in cyclopentane in the presence of said catalyst and under said conditions of temperature and pressure for a period of time ranging from 5 to 10 hours, introducing said air at a rate of from 20 to 130 gas volumes (STP) of air per liquid volume of dioxane per hour, during said oxidation withdrawing air containing volatilized liquids from the gas space above the liquid in the reaction zone at a rate sufficient to hold the pressure substantially constant, cooling said withdrawn air to condense said volatilized liquids, collecting the resulting liquid condensate, at the end of said period merging said liquid condensate with the reaction mixture from the reaction zone, and fractionally distilling the resulting mixture to recover therefrom ethylene diformate contained therein as the product of the process.

10. The process of making ethylene diformate which comprises charging a reaction mixture composed of equal volumes of dioxane and cyclopentane together with a small amount of cobaltous acetate into a closed pressure-resisting reaction vessel, passing air into the liquid in said vessel at a point near the bottom thereof in such manner that the air enters the mixture in the form of fine bubbles, introducing said air at the rate of about 60 gas volumes (STP) per volume of liquid in said vessel per hour, maintaining the pressure at about 400 pounds per square inch gauge throughout, maintaining the temperature at about 132° C. throughout, continuing introduction of said air for about 7 hours, during said introduction of air withdrawing from the gas space above the liquid air containing volatilized liquids at a rate sufficient to hold the pressure substantially constant, cooling said withdrawn air to condense said volatilized liquids, at the end of said 7-hour period combining the resulting liquid condensate with the reaction mixture and fractionally distilling the resulting mixture to recover therefrom ethylene diformate contained therein as the product of the process.

11. The process which comprises oxidizing dioxane in liquid phase with an oxygen-containing gas in the presence of a suitable oxidation catalyst at a temperature of from 100 to 150° C. and at a pressure of from 350 to 550 p. s. i. g.

12. The process which comprises oxidizing dioxane in liquid phase with an oxygen-containing gas in the presence of a suitable oxidation catalyst and at an elevated temperature and pressure such that ethylene diformate is formed.

HAROLD W. FLEMING.

REFERENCES CITED

The following references are of record in the file of this patent:

UNITED STATES PATENTS

| Number | Name | Date |
|---|---|---|
| 1,584,907 | Trusler | May 18, 1926 |
| 2,341,420 | Bartlett | Feb. 8, 1944 |
| 2,405,936 | Bartlett | Aug. 20, 1946 |

OTHER REFERENCES

Fairley et al., Chemical Abstracts, vol. 30, 1936, 7698.